US012462762B2

(12) United States Patent
Kim et al.

(10) Patent No.: US 12,462,762 B2
(45) Date of Patent: Nov. 4, 2025

(54) LIGHT-EMITTING DISPLAY DEVICE AND DRIVING METHOD THEREOF

(71) Applicant: LG DISPLAY CO., LTD., Seoul (KR)

(72) Inventors: Jeong Ho Kim, Paju-si (KR); Dae Kyu Kim, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/386,446

(22) Filed: Nov. 2, 2023

(65) Prior Publication Data

US 2024/0062725 A1 Feb. 22, 2024

Related U.S. Application Data

(63) Continuation of application No. 17/868,096, filed on Jul. 19, 2022, now Pat. No. 11,842,693.

(30) Foreign Application Priority Data

Aug. 10, 2021 (KR) ........................ 10-2021-0105687

(51) Int. Cl.

*G09G 3/3275* (2016.01)
*G09G 3/3241* (2016.01)
*G09G 3/3266* (2016.01)

(52) U.S. Cl.

CPC ......... *G09G 3/3275* (2013.01); *G09G 3/3241* (2013.01); *G09G 3/3266* (2013.01);
(Continued)

(58) Field of Classification Search

CPC ....... G09G 2230/00; G09G 2300/0426; G09G 2300/0819; G09G 2300/0842;
(Continued)

(56) References Cited

U.S. PATENT DOCUMENTS

2005/0156864 A1* 7/2005 Fujikura .............. G09G 3/3688 345/100
2011/0050741 A1* 3/2011 Jeong ................... G09G 3/3233 345/82

(Continued)

FOREIGN PATENT DOCUMENTS

CN 1933688 A 3/2007
CN 103714777 A 4/2014

(Continued)

OTHER PUBLICATIONS

Chinese Office Action dated Mar. 29, 2024 issued in Patent Application No. 2022108849745 w/English Translation (14 pages).

(Continued)

*Primary Examiner* — Nitin Patel
*Assistant Examiner* — Amen W Bogale
(74) *Attorney, Agent, or Firm* — Fish & Richardson P.C.

(57) ABSTRACT

A light-emitting display apparatus includes a display panel configured to display an image, a data driving circuit configured to apply a data voltage to the display panel, and a signal applying circuit configured to apply a data voltage output from a first channel of the data driving circuit to one of at least two data lines disposed on the display panel, in which the signal applying circuit includes a compensation circuit configured to prevent a data voltage increase due to signal coupling when the data voltage output from the first channel is applied to one of the at least two data lines.

5 Claims, 17 Drawing Sheets

(52) U.S. Cl.
CPC ............... *G09G 2300/0426* (2013.01); *G09G 2300/0819* (2013.01); *G09G 2300/0842* (2013.01); *G09G 2310/0297* (2013.01); *G09G 2310/08* (2013.01); *G09G 2320/0233* (2013.01)

(58) Field of Classification Search
CPC ... G09G 2300/0852; G09G 2310/0297; G09G 2310/08; G09G 2320/0209; G09G 2320/0233; G09G 2320/0238; G09G 3/3241; G09G 3/3266; G09G 3/3275
See application file for complete search history.

(56) References Cited

U.S. PATENT DOCUMENTS

| | | | | |
|---|---|---|---|---|
| 2013/0147780 | A1* | 6/2013 | Kita ....................... | G09G 5/001 345/211 |
| 2015/0156829 | A1 | 6/2015 | Lin et al. | |
| 2016/0209808 | A1* | 7/2016 | Byun ..................... | G09G 3/003 |
| 2017/0337860 | A1* | 11/2017 | Yi ........................ | G09G 3/3648 |
| 2018/0012540 | A1* | 1/2018 | Hosoyachi ........... | G09G 3/3688 |
| 2020/0159053 | A1 | 5/2020 | Fujikawa | |
| 2020/0193914 | A1* | 6/2020 | Shin ..................... | G09G 3/3688 |
| 2021/0241709 | A1* | 8/2021 | Takeuchi ............. | G09G 3/3677 |
| 2022/0115463 | A1* | 4/2022 | Han ..................... | H10K 59/124 |
| 2022/0199048 | A1* | 6/2022 | Ichikura .................. | G02F 1/133 |

FOREIGN PATENT DOCUMENTS

| | | | |
|---|---|---|---|
| CN | 109634010 | A | 4/2019 |
| CN | 111326107 | A | 6/2020 |
| JP | 2008-514976 | A | 5/2008 |
| KR | 10-2012-0038133 | A | 4/2012 |
| KR | 10-2020-0011856 | A | 2/2020 |

OTHER PUBLICATIONS

Office Action in Korean Appln. No. 10-2021-0105687, mailed on Jan. 27, 2025, 10 pages (with English translation).

* cited by examiner

LIGHT-EMITTING DISPLAY DEVICE AND DRIVING METHOD THEREOF

CROSS-REFERENCE TO RELATED APPLICATIONS

This application is a continuation of U.S. patent application Ser. No. 17/868,096, filed on Jul. 19, 2022, which claims the priority of Korean Patent Application No. 10-2021-0105687, filed on Aug. 10, 2021, which are hereby incorporated by reference in their entirety.

BACKGROUND

Field of the Disclosure

The present disclosure relates to a light-emitting display device (or apparatus) and a driving method thereof.

Description of the Background

With the development of information technology, the market for display devices, which are connection media between users and information, has been growing. Accordingly, there has been an increase in use of display devices such as a light-emitting display device (LED), a quantum dot display device (QDD), and a liquid crystal display device (LCD).

The display devices described above each include a display panel including subpixels, a driving circuit configured to output a driving signal for driving the display panel, a power supply circuit configured to generate power to be supplied to the display panel or the driving circuit, etc.

In each of the display devices, when a driving signal, for example, a scan signal, a data signal, etc. is supplied to the subpixels formed in the display panel, an image may be displayed by a selected subpixel transmitting light or directly emitting light.

SUMMARY

Accordingly, the present disclosure is directed to a light-emitting display device (apparatus) and a driving method thereof that substantially obviate one or more problems due to limitations and disadvantages of the conventional art.

More specifically, the present disclosure is to minimize an influence of coupling by a mux signal to prevent data voltage fluctuation or luminance fluctuation, relieve a black floating defect that may occur during driving in a low gradation area, and minimize luminance deviation between a linear portion and a deformed portion when applied to a deformed display panel.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a light-emitting display device includes a display panel configured to display an image, a data driving circuit configured to apply a data voltage to the display panel, and a signal applying circuit configured to apply a data voltage output from a first channel of the data driving circuit to one of at least two data lines disposed on the display panel, in which the signal applying circuit includes a compensation circuit configured to prevent a data voltage increase due to signal coupling when the data voltage output from the first channel is applied to one of the at least two data lines.

The compensation circuit may include a transistor having a first electrode and a second electrode connected to a data line for transmitting the data voltage and a gate electrode connected to a compensation signal line to which a compensation signal is applied.

The compensation circuit may include a capacitor having a first electrode connected to a data line for transmitting the data voltage and a second electrode connected to a compensation signal line to which a compensation signal is applied.

The compensation circuit may be disposed close to the signal applying circuit.

The compensation circuit may be disposed between the signal applying circuit and a display area of the display panel.

The transistor may operate opposite to a mux switch included to apply the data voltage in the signal applying circuit.

When the mux switch is turned on in response to a logic-high mux signal to apply the data voltage, the transistor may be turned off in response to a logic-low compensation signal, and when the mux switch is turned off in response to a logic-low mux signal not to apply the data voltage, the transistor may be turned on in response to a logic-high compensation signal.

The compensation signal may be configured in a form opposite to a form of the mux signal, and may be applied in a form that a rising edge, a falling edge, or the rising edge and the falling edge are delayed or advanced.

A compensation signal in a pulse form or a DC form may be applied to the compensation signal line.

In another aspect of the present disclosure, a driving method of a light-emitting display device includes a display panel configured to display an image, a data driving circuit configured to apply a data voltage to the display panel, a signal applying circuit configured to apply a data voltage output from a first channel of the data driving circuit to one of at least two data lines disposed on the display panel, and a compensation circuit configured to prevent a data voltage increase due to signal coupling when the data voltage output from the first channel is applied to one of the at least two data lines. The driving method of the light-emitting display device includes applying a mux signal to the signal applying circuit to apply the data voltage, and applying a compensation signal to the compensation circuit to prevent data voltage increase due to signal coupling when the data voltage output from the first channel is applied to one of the at least two data lines.

The compensation signal may be configured in a form opposite to a form of the mux signal and may be applied.

The compensation signal may be configured in a form opposite to a form of the mux signal, and may be applied in a form that a rising edge, a falling edge, or the rising edge and the falling edge are delayed or advanced.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

BRIEF DESCRIPTION OF THE DRAWINGS

Figure 1:
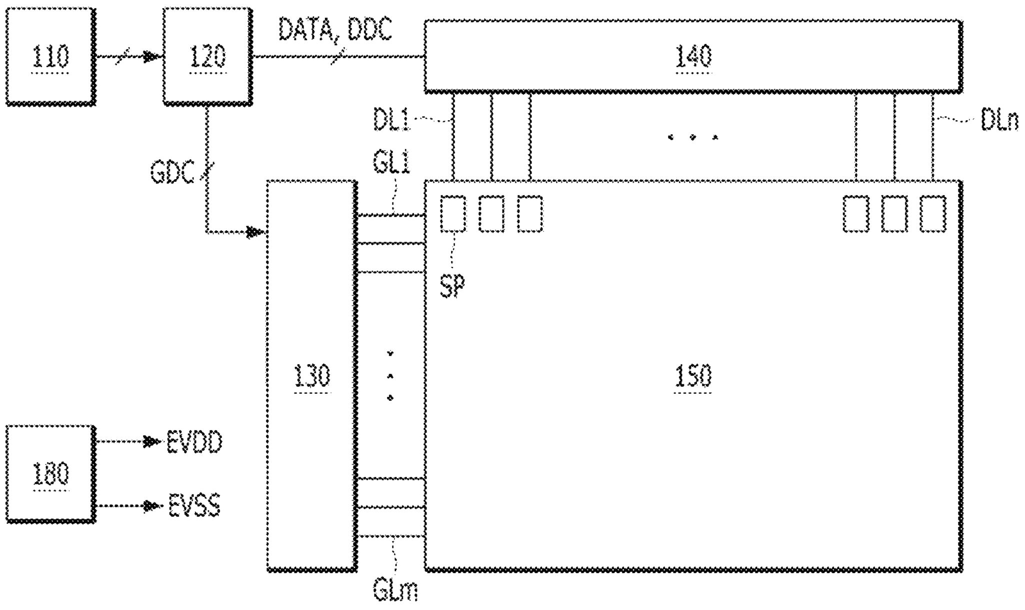
Figure 2:
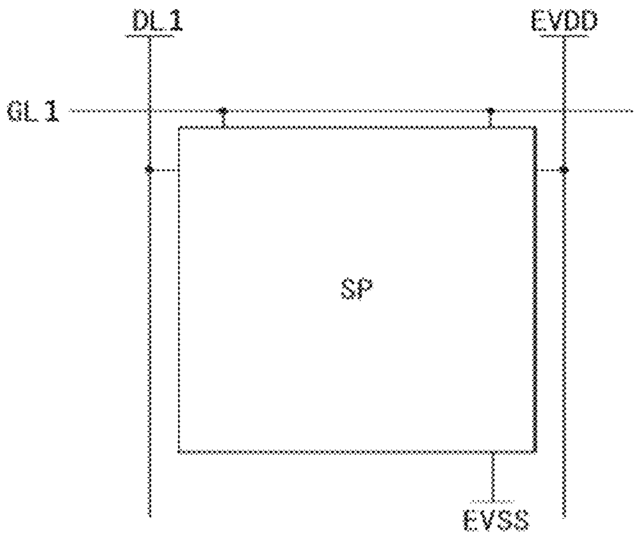
Figure 3A:
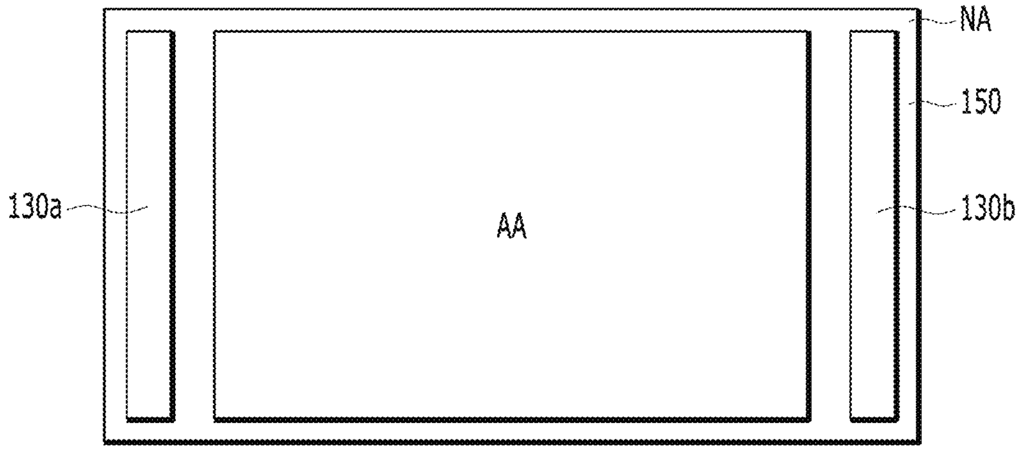
Figure 3B:
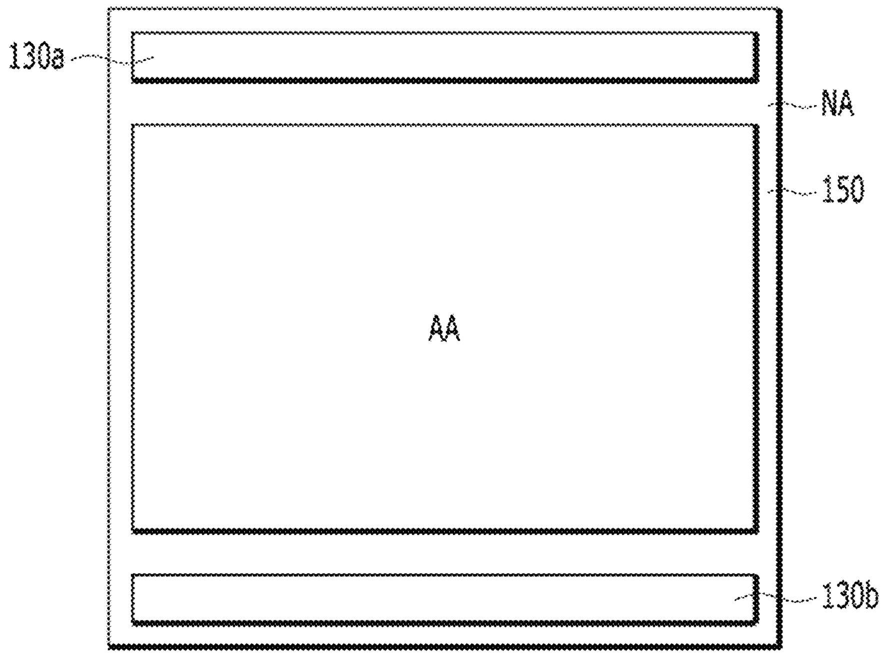
Figure 4:
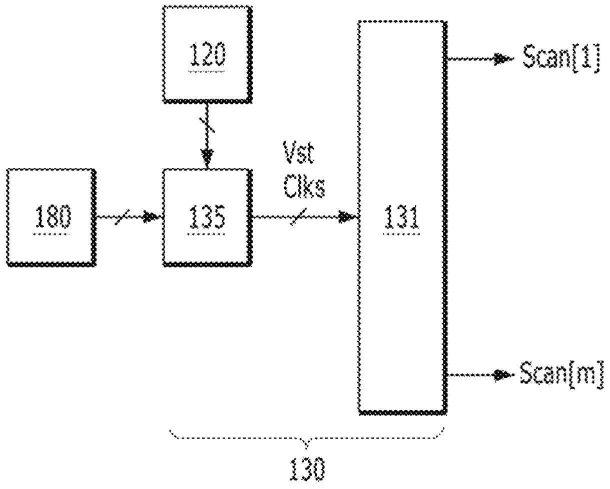
Figure 5:
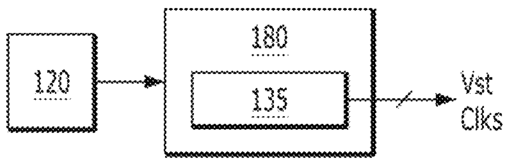
Figure 6:
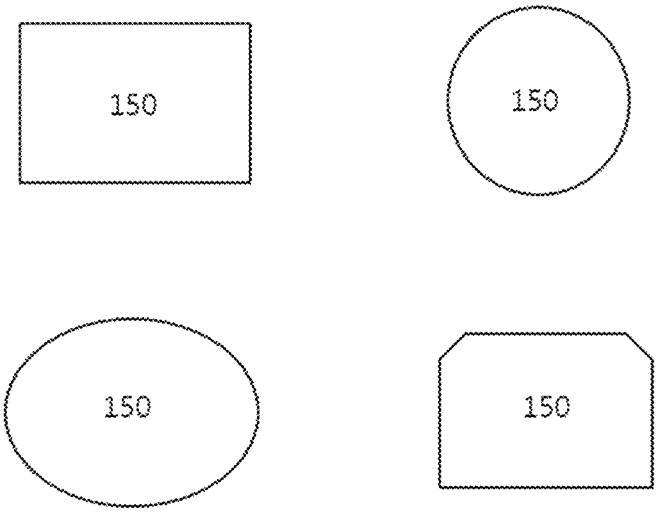
Figure 7:
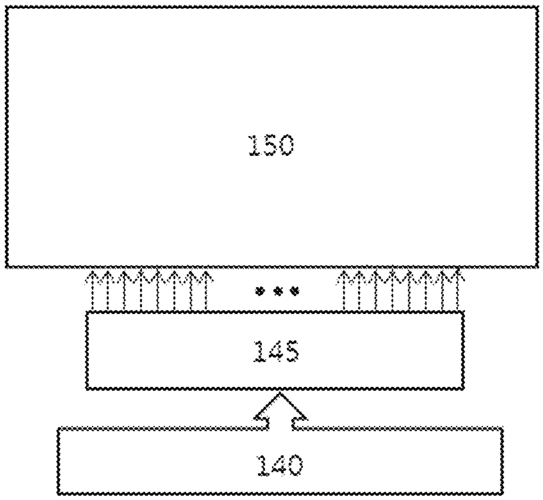
Figure 8:
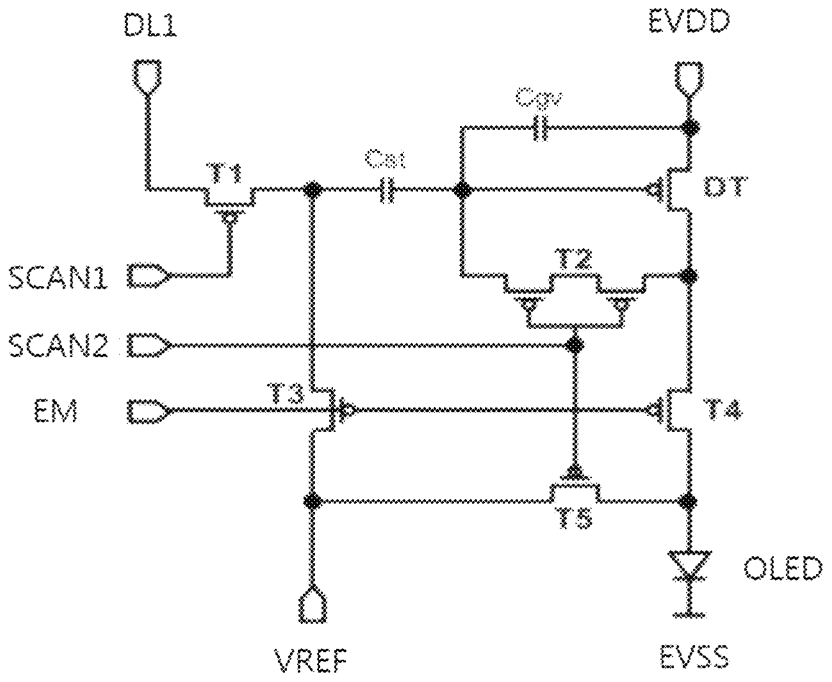
Figure 9:
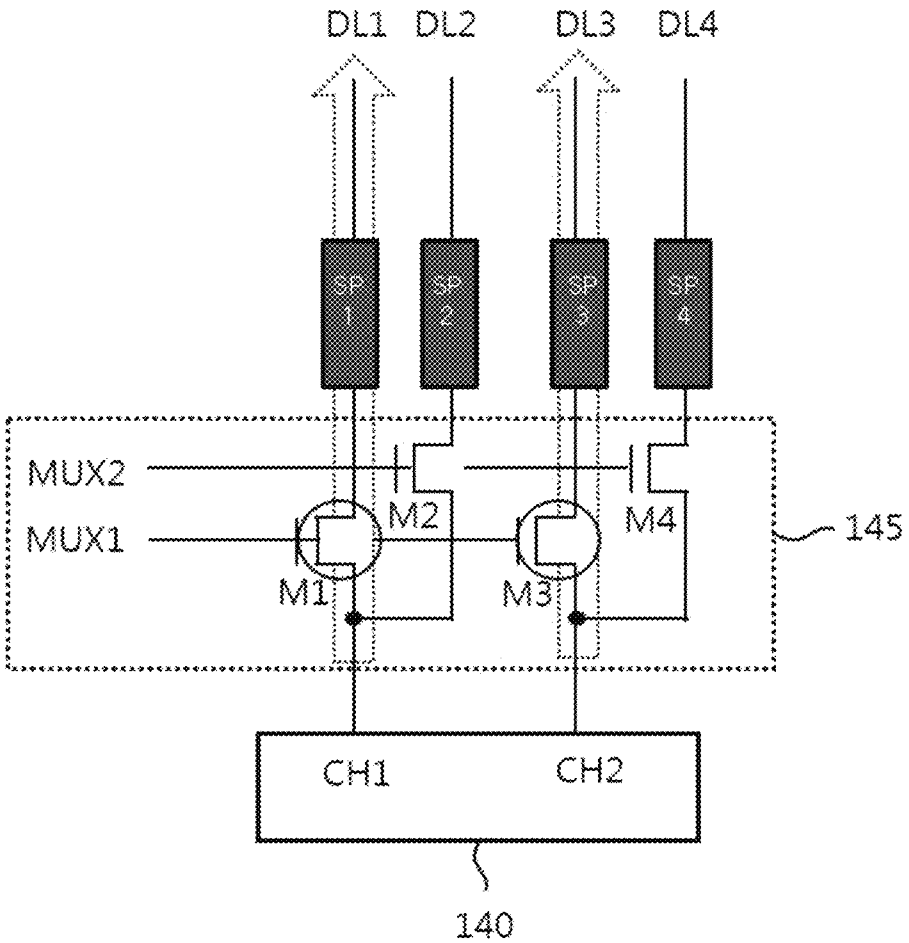
Figure 10:
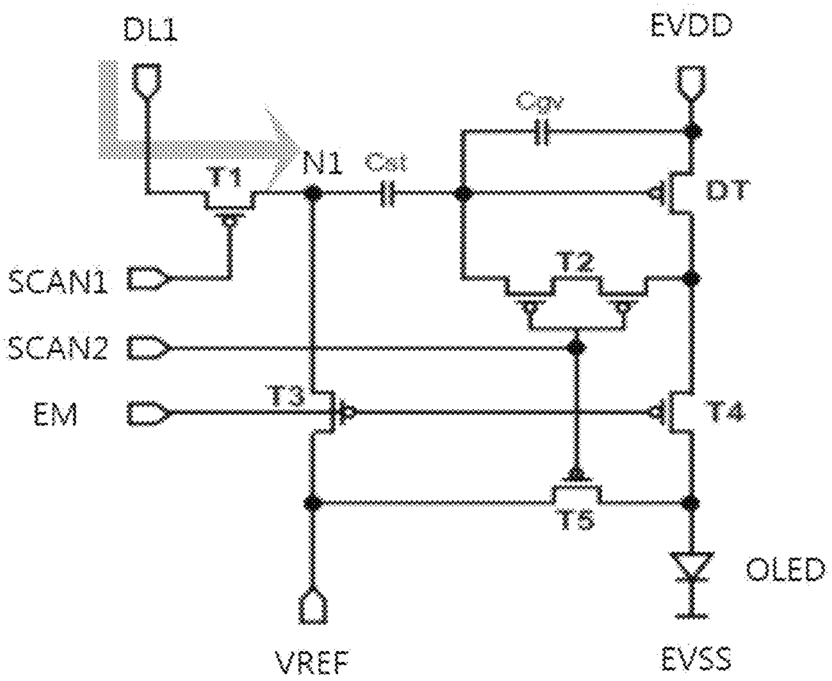
Figure 11:
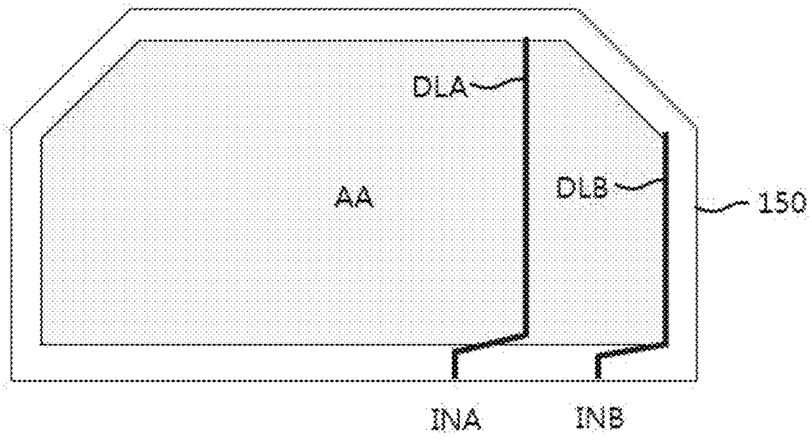
Figure 12:
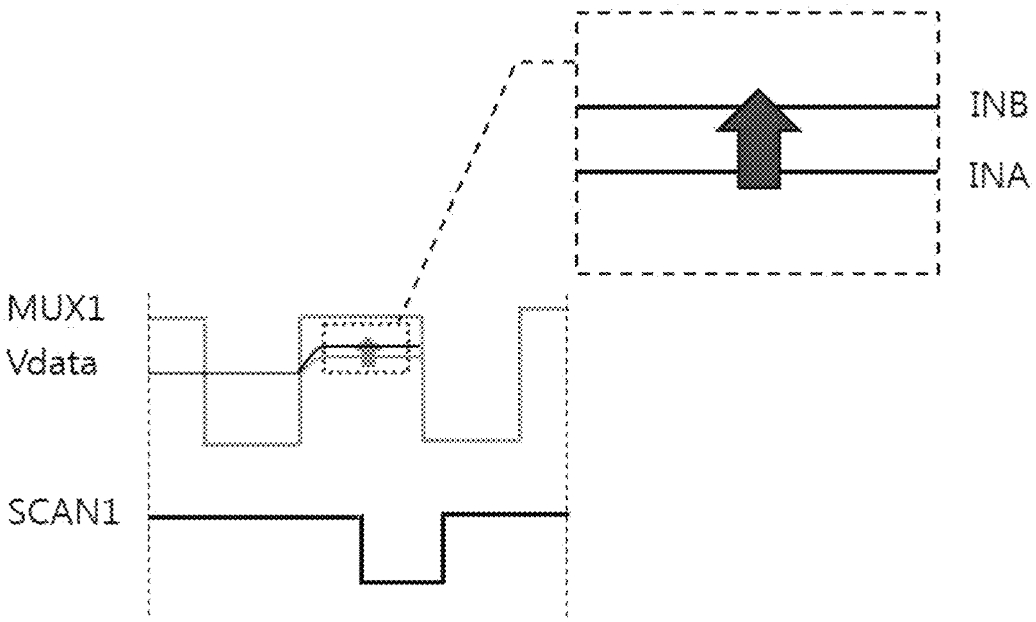
Figure 13:
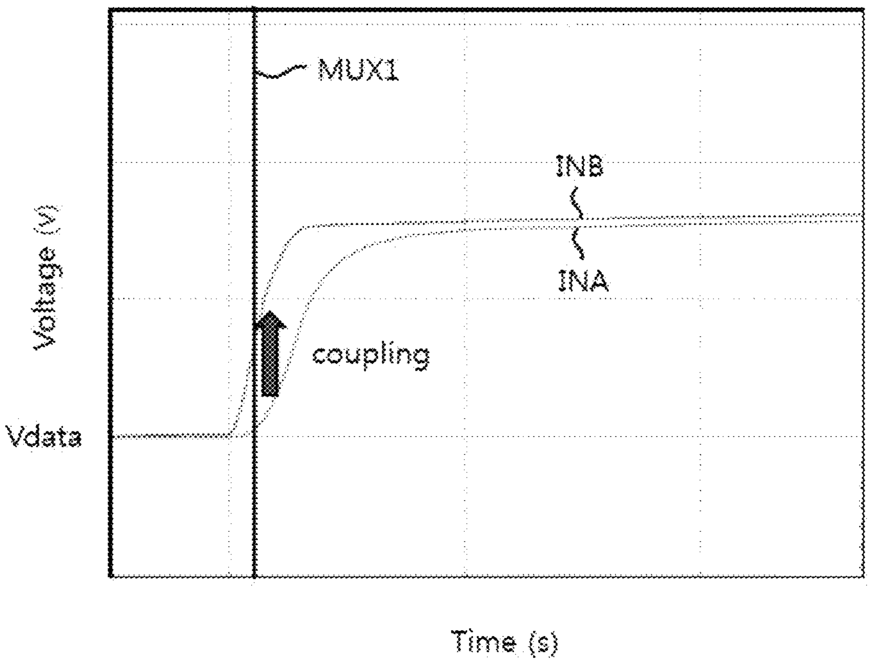
Figure 14:
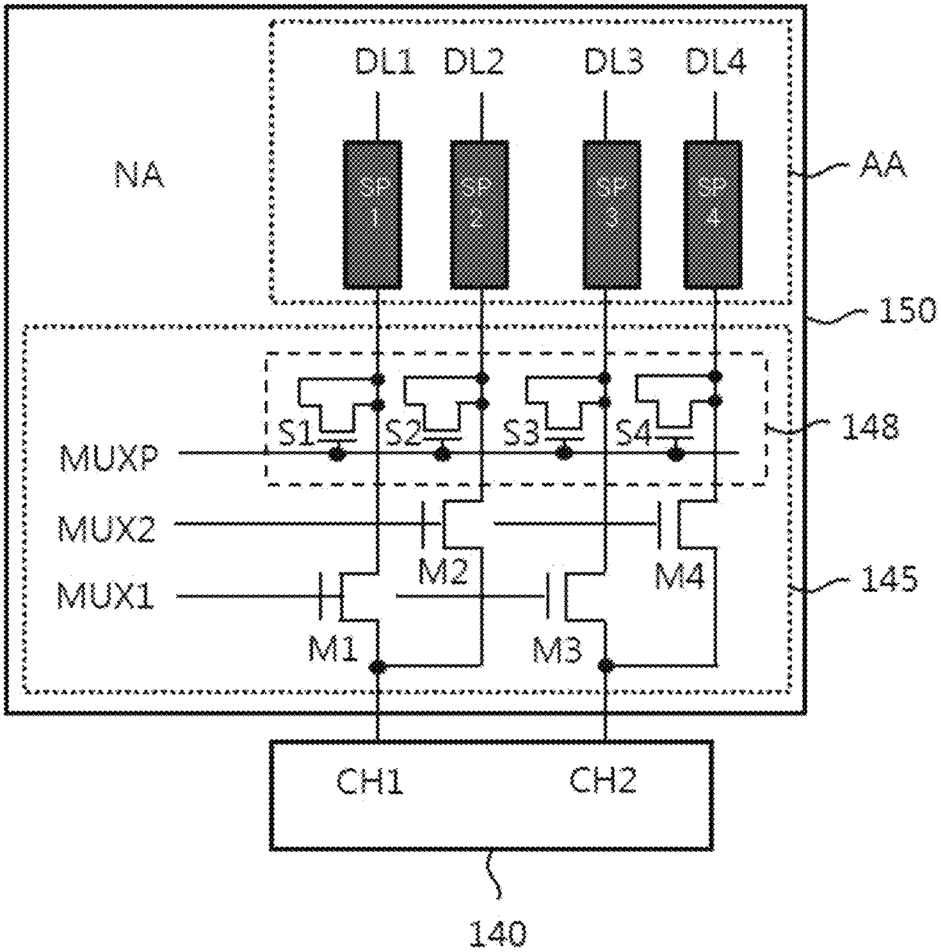
Figure 15:
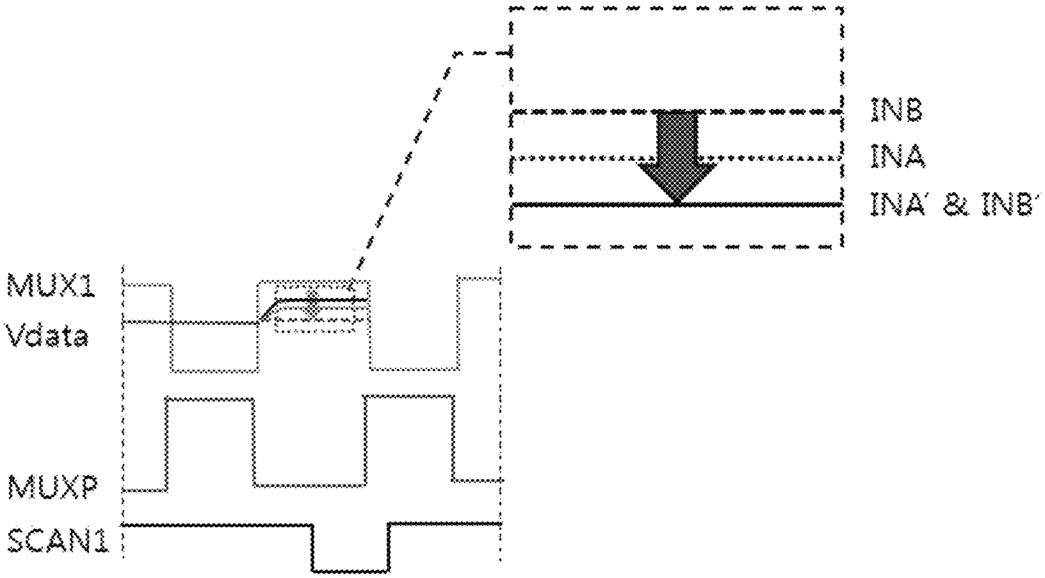
Figure 16:
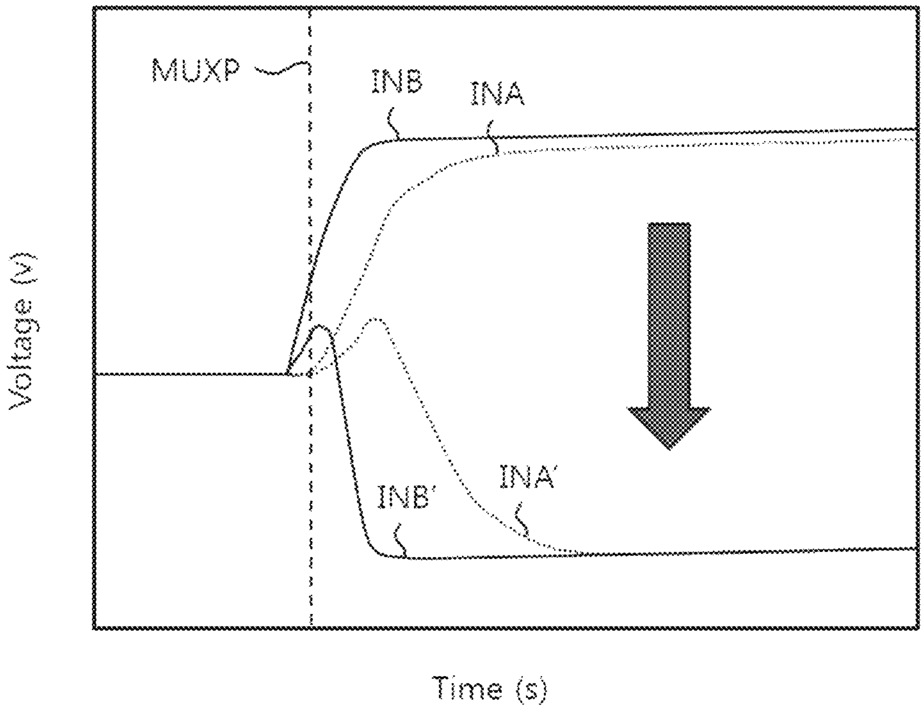
Figure 17:
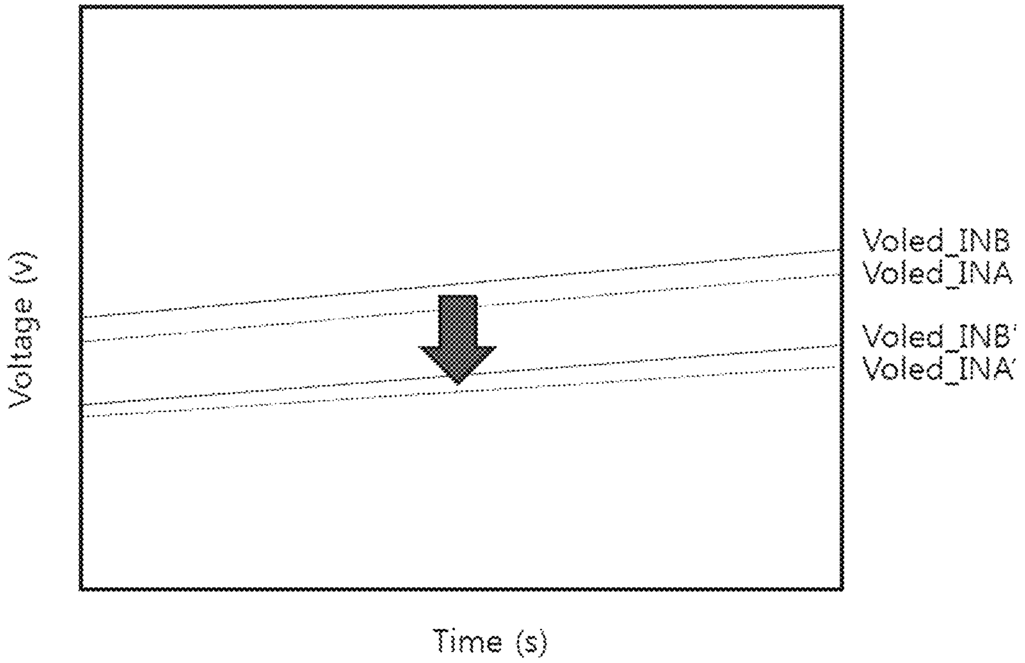
Figure 18A:
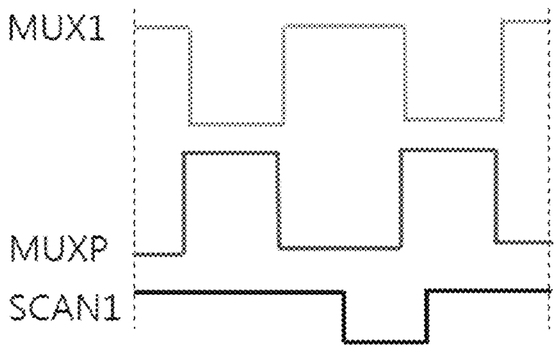
Figure 18B:
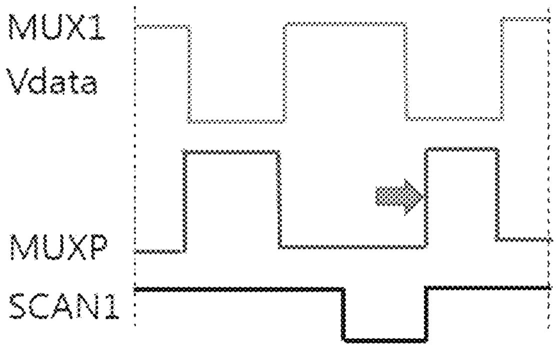
Figure 18C:
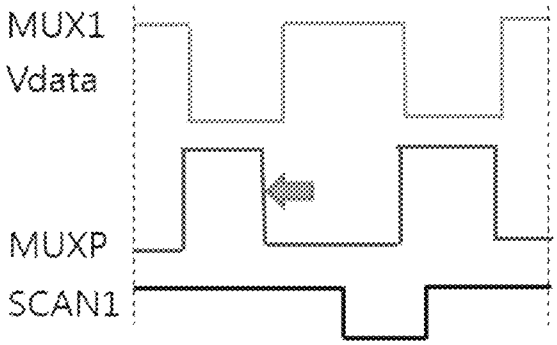
Figure 18D:
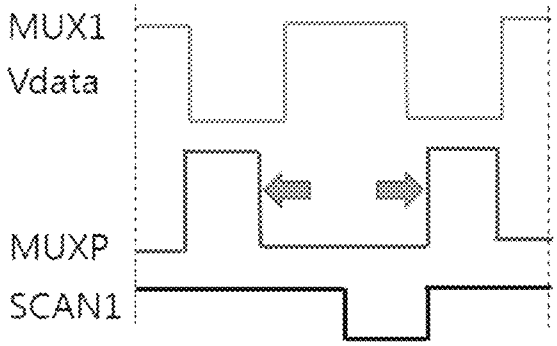
Figure 19:
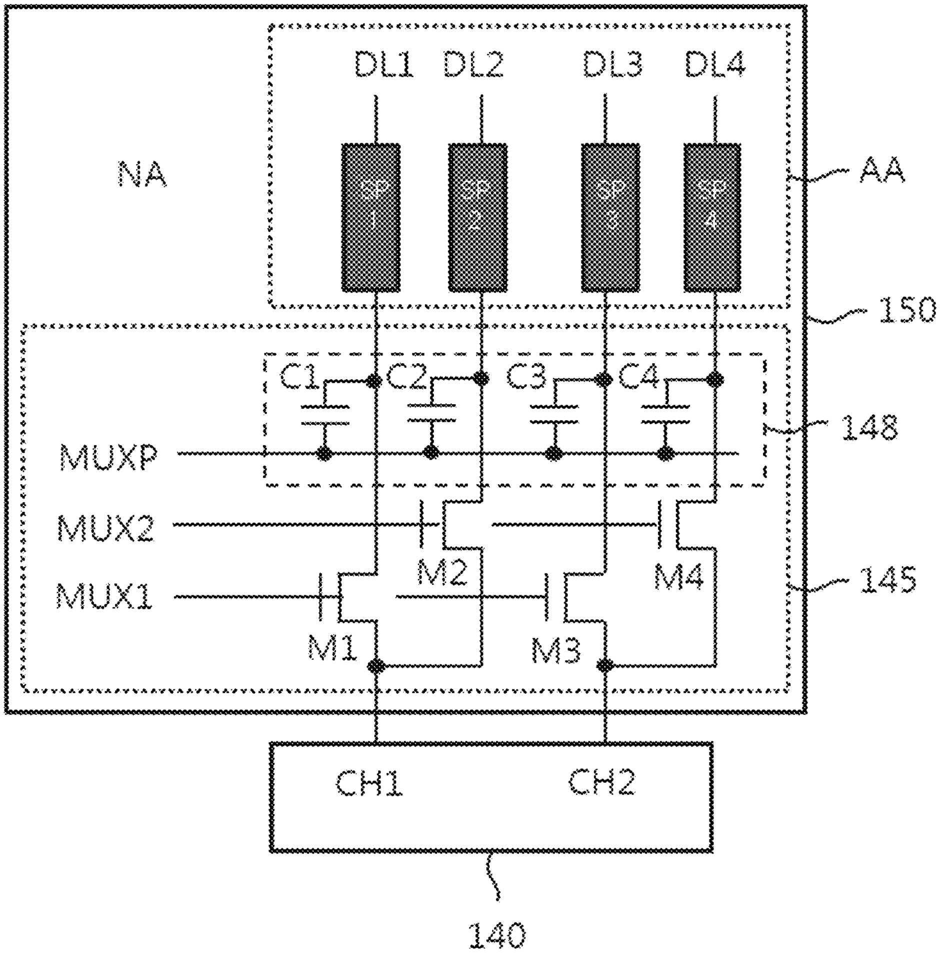

FIG. 1 is a block diagram schematically illustrating a light-emitting display device;

FIG. 2 is a configuration diagram schematically illustrating a subpixel illustrated in FIG. 1;

FIGS. 3A and 3B are diagrams illustrating arrangement examples of a gate-in-panel type scan driving circuit;

FIGS. 4 and 5 are diagrams illustrating configurations of devices related to the gate-in-panel type scan driving circuit;

FIG. 6 is a diagram illustrating shapes of a display panel;

FIG. 7 is a diagram illustrating a data voltage application method using a demultiplexer;

FIG. 8 is a diagram illustrating a circuit configuration of a subpixel;

FIG. 9 is a configuration diagram for describing a demultiplexer according to an experimental example;

FIG. 10 is a diagram illustrating a node charged with a data voltage;

FIGS. 11 to 13 are diagrams for describing a result of implementing a deformed light-emitting display device based on the demultiplexer according to the experimental example and evaluating the same;

FIG. 14 is a configuration diagram illustrating a demultiplexer according to a first aspect of the present disclosure;

FIGS. 15 to 17 are diagrams for describing a result of implementing a deformed light-emitting display device based on the demultiplexer according to the first aspect and evaluating the same;

FIGS. 18A to 18D are diagrams illustrating various examples of a compensation signal; and FIG. 19 is a configuration diagram illustrating a demultiplexer according to a second aspect of the present disclosure.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

A display device (or a display apparatus) according to the present disclosure may be implemented as a television, a video player, a personal computer (PC), a home theater, an automobile electric device, a smartphone, etc., but is not limited thereto. The display device according to the present disclosure may be implemented as an LED, a QDD, an LCD, etc. However, hereinafter, for convenience of description, a light-emitting display device that directly emits light based on an inorganic light-emitting diode or an organic light-emitting diode will be given as an example.

FIG. 1 is a configuration diagram schematically illustrating the light-emitting display device (the light-emitting display apparatus), and FIG. 2 is a block diagram schematically illustrating a subpixel illustrated in FIG. 1.

As illustrated in FIGS. 1 and 2, the light-emitting display device may include an image supply part (or circuit) 110, a timing controller 120, a scan driving part (or circuit) 130, a data driving part (or circuit) 140, a display panel 150, and a power supply part (or circuit) 180, etc.

The image supply part (set or host system) 110 may output various driving signals along with a data signal supplied from the outside or a data signal stored in an internal memory. The image supply part 110 may supply a data signal and various driving signals to the timing controller 120.

The timing controller 120 may output a gate timing control signal GDC for controlling the operation timing of the scan driving part 130, a data timing control signal DDC for controlling the operation timing of the data driving part 140, various synchronization signals (Vsync, which is a vertical synchronization signal, and Hsync, which is a horizontal synchronization signal), etc. The timing controller 120 may supply a data signal DATA supplied from the image supply part 110 together with the data timing control signal DDC to the data driving part 140. The timing controller 120 may be formed as an integrated circuit (IC) and mounted on a printed circuit board, but is not limited thereto.

The scan driving part 130 may output a scan signal (or a scan voltage) in response to the gate timing control signal GDC supplied from the timing controller 120. The scan driving part 130 may supply a scan signal to subpixels included in the display panel 150 through gate lines GL1 to GLm. The scan driving part 130 may be formed as an IC or may be formed directly on the display panel 150 in a gate-in-panel method, but is not limited thereto.

The data driving part 140 may sample and latch the data signal DATA in response to the data timing control signal DDC supplied from the timing controller 120, convert a digital data signal into an analog data voltage based on a gamma reference voltage, and output the analog data voltage. The data driving part 140 may supply a data voltage to the subpixels included in the display panel 150 through data lines DL1 to DLn. The data driving part 140 may be formed as an IC and mounted on the display panel 150 or mounted on a printed circuit board, but is not limited thereto.

The power supply part 180 may generate first power having a high potential and second power having a low potential based on an external input voltage supplied from the outside, and output the first power and the second power through a first power line EVDD and a second power line EVSS. The power supply part 180 may generate a voltage necessary to drive the scan driving part 130 (for example, a gate voltage including a gate high voltage and a gate low voltage) or a voltage necessary to drive the data driving part 140 (a drain voltage including a drain voltage and a half-drain voltage) in addition to the first power and the second power.

The display panel 150 may display an image in response to a driving signal including a scan signal and a data voltage, first power, second power, etc. The subpixels of the display panel 150 directly emit light. The display panel 150 may be manufactured based on a substrate having rigidity or flexibility, such as glass, silicon, polyimide, etc. In addition, the subpixels that emit light may include pixels including red, green, and blue or pixels including red, green, blue, and white.

For example, one subpixel SP may be connected to the first data line DL1, the first gate line GL1, the first power line EVDD, and the second power line EVSS, and may include a pixel circuit having a switching transistor, a driving transistor, a capacitor, an organic light-emitting diode (OLED), etc. Since the subpixel SP used in the light-emitting display device directly emits light, a circuit configuration is complicated. In addition, there are various compensation circuits for compensating for deterioration of the OLED that emits light as well as the driving transistor that supplies a driving current to the OLED. Accordingly, note that the subpixel SP is simply illustrated in the form of a block.

Meanwhile, in the above description, the timing controller 120, the scan driving part 130, the data driving part 140, etc. have been described as individual elements. However, depending on the implementation method of the light-emitting display device, one or more of the timing controller 120, the scan driving part 130, and the data driving part 140 may be integrated into one IC.

FIGS. 3A and 3B are diagrams illustrating arrangement examples of a gate-in-panel type scan driving part, and FIGS. 4 and 5 are diagrams illustrating configurations of devices related to the gate-in-panel type scan driving part.

As illustrated in FIGS. 3A and 3B, gate-in-panel type scan driving parts 130*a* and 130*b* are disposed in a non-display area NA of the display panel 150. As illustrated in FIG. 3A, the scan driving parts 130*a* and 130*b* may be disposed in left and right parts of the non-display area NA in the display panel 150. Alternatively, as illustrated in FIG. 3B, the scan driving parts 130*a* and 130*b* may be disposed in upper and lower parts of the non-display area NA in the display panel 150.

The scan driving parts 130*a* and 130*b* are illustrated and described as being disposed in the non-display area NA located on the left and right sides or upper and lower sides of a display area AA. However, the scan driving parts 130*a* and 130*b* may be disposed on one side of the left side, right side, upper side, or lower side.

As illustrated in FIG. 4, the gate-in-panel type scan driving part 130 may include a shift register 131 and a level shifter 135. The level shifter 135 may generate clock signals Clks and a start signal Vst based on signals and voltages output from the timing controller 120 and the power supply part 180. The clock signals Clks may be generated in the form of K (K being an integer greater than or equal to 2) different phases, such as two-phase, four-phase, and eight-phase.

The shift register 131 may operate based on the signals Clks and Vst output from the level shifter 135, and output scan signals Scan[1] to Scan[m] capable of turning on or off a transistor formed on the display panel. The shift register 131 may be formed as a thin film on the display panel using a gate-in-panel method. Accordingly, the parts 130*a* and 130*b* formed on the non-display area NA of the display panel 150 illustrated in FIG. 3 may correspond to the shift register 131.

As illustrated in FIGS. 4 and 5, unlike the shift register 131, the level shifter 135 may be independently formed as an IC or may be included in the power supply part 180, which is only an example and the present disclosure is not limited thereto.

FIGS. 6A to 6D are diagrams illustrating shapes of the display panel, FIG. 7 is a diagram illustrating a data voltage application method using a demultiplexer, and FIG. 8 is a diagram illustrating a circuit configuration of a subpixel.

As illustrated in FIG. 6, the display panel 150 may be implemented in various shapes, such as a rectangle (or a quadrangle), a circle, an oval, and a hexagon. Except for the generally widely used rectangular display panel 150, the display panel 150 has a different shape (an uncommon shape), and thus is also referred to as a deformed display panel.

As illustrated in FIG. 7, the light-emitting display device may include a demultiplexer (signal applying part) 145. The demultiplexer 145 may be disposed between the data driving part 140 and the display panel 150. The demultiplexer 145 may provide a method (demultiplexing method) of time-dividing (processing two or more signals or two pieces or more of data by time division) and applying a data voltage output from an output channel of the data driving part 140 to one of at least two data lines disposed on the display panel 150. The demultiplexing method may provide various advantages when implementing the light-emitting display device, such as a reduction in the number of output channels of the data driving part 140, a reduction in power consumption, and a reduction in heat generation.

As illustrated in FIG. 8, the subpixel may include five switching transistors T1 to T5, one driving transistor DT, one storage capacitor Cst, and one light-emitting diode OLED. Cgv may be a compensation capacitor provided for compensation, which may be omitted.

The first switching transistor T1 may transfer a data voltage applied through the first data line DL1 to one end of the storage capacitor Cst in response to a first scan signal applied through a first scan line SCAN1.

The second switching transistor T2 may electrically connect a gate electrode and a second electrode of the driving transistor DT to each other (putting DT into a diode connection state for threshold voltage compensation) in response to a second scan signal applied through a second scan line SCAN2.

The third switching transistor T3 may transfer a reference voltage (an initialization voltage or a compensation voltage) applied through a reference line VREF to one end of the storage capacitor Cst in response to an emission control signal (or a third scan signal) applied through an emission control line (or a third scan line) EM.

The fourth switching transistor T4 may transfer a driving current generated from the driving transistor DT to an anode electrode of the light-emitting diode OLED in response to an emission control signal applied through the emission control line EM.

The storage capacitor Cst may store a data voltage and drive the driving transistor DT based on the stored data voltage. The light-emitting diode OLED may emit light based on a driving current generated from the driving transistor DT.

The subpixel illustrated in FIG. 8 has various advantages in that the subpixel may compensate for a threshold voltage of the driving transistor DT based on the second and third switching transistors T2 and T3, and control an emission time of the light-emitting diode OLED based on the fourth switching transistor T4.

Meanwhile, in FIG. 8, an example in which all the thin film transistors included in the subpixel are P-type transistors has been described. However, all the thin film transistors included in the subpixel may be implemented as N-type transistors or in a mixed structure of P-type and N-type transistors. In addition, FIG. 8 is only illustrated and described to assist in understanding of charging and operation of the data voltage applied to the subpixel in connection with the following aspect, and the present disclosure is not limited thereto.

FIG. 9 is a configuration diagram for describing a demultiplexer according to an experimental example, FIG. 10 is a diagram illustrating a node charged with a data voltage, and FIGS. 11 to 13 are diagrams for describing a result of implementing a deformed light-emitting display device based on the demultiplexer according to the experimental example and evaluating the same.

As illustrated in FIGS. 9 to 13, the demultiplexer 145 according to the experimental example may include a first mux switch M1 to a fourth mux switch M4. The first mux switch M1 to the fourth mux switch M4 included in the demultiplexer 145 may be located in the non-display area NA of the display panel 150.

The first mux switch M1 to the fourth mux switch M4 may be turned on or off in response to a first mux signal and a second mux signal applied through a first mux signal line MUX1 and a second mux signal line MUX2. The first mux switch M1 and the third mux switch M3 may be simultaneously turned on or off in response to the first mux signal, and the second mux switch M2 and the fourth mux switch M4 may be simultaneously turned on or off in response to the second mux signal.

In the demultiplexer 145 according to the experimental example, when a logic-high first mux signal is applied, data voltages output from a first channel CH1 and a second channel CH2 of the data driving part 140 may be applied to a first subpixel SP1 and a second subpixel SP2 through the first data line DL1 and the third data line DL3. As may be seen with reference to FIG. 10, a data voltage Vdata applied through the first data line DL1 may be transferred to a first node N1, which is one end of the storage capacitor Cst, through the turned-on first switching transistor T1.

Incidentally, the first mux signal line MUX1 transmitting the first mux signal and the second mux signal line MUX2 transmitting the second mux signal are disposed to intersect the data lines DL1 to DL4. For this reason, it has been found that the data voltage is affected by signal coupling with the mux signal whenever the first mux signal or the second mux signal is generated as logic high.

In addition, when the demultiplexer 145 according to the experimental example illustrated in FIG. 9 is implemented in the deformed display panel 150 illustrated in FIG. 11, the coupling effect is more severe than when the demultiplexer 145 is implemented in a rectangular display panel, which is described as follows.

The deformed display panel 150 may include an A-th data line DLA having a first length across the display area AA and a B-th data line DLB having a second length shorter than the first length. The A-th data line DLA having the first length is disposed in a linear shape, and thus may be referred to as a linear portion INA, and the B-th data line DLB having the second length is disposed in a deformed (or non-linear) shape, and thus may be referred to as a deformed portion (or non-linear portion) INB.

As such, the deformed display panel 150 may include data lines having different lengths in the display area AA. To solve a problem caused by the difference in length between the data lines, deviation compensation that matches both conditions may be performed based on a line capacitor or a line resistor.

However, even the deviation compensation is performed, if the data voltage Vdata is affected by signal coupling with the mux signal MUX1, as illustrated in FIG. 12, the data voltage Vdata may increase, or a voltage difference may occur between the linear portion INA and the deformed portion INB according to a coupling degree. Meanwhile, note that in FIG. 12, since the switching transistor included in the subpixel is implemented as a P-type transistor as an example, the logic-high mux signal MUX1 is applied in response to the logic-low first scan signal SCAN1 as an example.

In addition, as illustrated in FIG. 12, when coupling occurs, the data voltage Vdata applied to the linear portion INA and the deformed portion INB increases, and the increased data voltage Vdata increases the luminance of the light-emitting diode to cause a black floating (a phenomenon in which it becomes brighter than desired black color) defect in a low gradation area. This phenomenon may be confirmed from a simulation result of FIG. 13 showing a voltage difference between the linear portion INA and the deformed portion INB according to the degree of coupling as the data voltage Vdata applied to the linear portion INA and the deformed portion INB increases due to coupling.

FIG. 14 is a configuration diagram illustrating a demultiplexer according to a first aspect of the present disclosure, FIGS. 15 to 17 are diagrams for describing a result of implementing a deformed light-emitting display device based on the demultiplexer according to the first aspect and evaluating the same, and FIGS. 18A to 18D are diagrams illustrating various examples of a compensation signal.

As illustrated in FIG. 14, the demultiplexer 145 according to the first aspect may include a first mux switch M1 to a fourth mux switch M4 and a first transistor S1 to a fourth transistor S4. The first transistor S1 to the fourth transistor S4 are compensation circuits 148 that prevent coupling with the data lines when the first mux switch M1 to the fourth mux switch M4 are turned on. The first mux switch M1 to the fourth mux switch M4 and the first transistor S1 to the fourth transistor S4 included in the demultiplexer 145 may be located in the non-display area NA of the display panel 150.

The first transistor S1 to the fourth transistor S4 may be disposed adjacent to the first mux switch M1 to the fourth mux switch M4 for coupling compensation. As an example, the transistors S1 to S4 may be disposed between the data driving part 130 and the mux switches M1 to M4. As another example, the transistors S1 to S4 may be disposed between the mux switches M1 to M4 and subpixels SP1 to SP4. The transistors S1 to S4 may be disposed between the MUX switches M1 to M4 and the display area AA for efficient coupling compensation. However, the present disclosure is not limited thereto.

The first mux switch M1 to the fourth mux switch M4 may be turned on or off in response to a first mux signal and a second mux signal applied through a first mux signal line MUX1 and a second mux signal line MUX2. The first mux switch M1 and the third mux switch M3 may be simultaneously turned on or off in response to the first mux signal, and the second mux switch M2 and the fourth mux switch M4 may be simultaneously turned on or off in response to the second mux signal. The first transistor S1 to the fourth transistor S4 may be turned on or off in response to a compensation signal applied through a compensation signal line MUXP. The first transistor S1 to the fourth transistor S4 may be simultaneously turned on or off in response to the compensation signal.

The first mux switch M1 may have a first electrode connected to the first channel CH1 of the data driving part 140, a second electrode connected to the first data line DL1, and a gate electrode connected to the first mux signal line MUX1. The second mux switch M2 may have a first electrode connected to the first channel CH1 of the data driving part 140, a second electrode connected to the second data line DL2, and a gate electrode connected to the second mux signal line MUX2. The third mux switch M3 may have a first electrode connected to the second channel CH2 of the data driving part 140, a second electrode connected to the third data line DL3, and a gate electrode connected to the first mux signal line MUX1. The fourth mux switch M4 may have a first electrode connected to the second channel CH2 of the data driving part 140, a second electrode connected to the fourth data line DL4, and a gate electrode connected to the second mux signal line MUX2.

The first transistor S1 may have a first electrode and a second electrode connected to the first data line DL1 and a gate electrode connected to the compensation signal line MUXP. The second transistor S2 may have a first electrode and a second electrode connected to the second data line DL2 and a gate electrode connected to the compensation signal line MUXP. The third transistor S3 may have a first electrode and a second electrode connected to the third data line DL3 and a gate electrode connected to the compensation signal line MUXP. The fourth transistor S4 may have a first electrode and a second electrode connected to the fourth data line DL4 and a gate electrode connected to the compensation signal line MUXP.

The first mux signal line MUX1 transmitting the first mux signal and the second mux signal line MUX2 transmitting the second mux signal are disposed to intersect the data lines DL1 to DL4. In addition, the compensation signal line MUXP that transmits the compensation signal is disposed to intersect the data lines DL1 to DL4.

As illustrated in FIG. 15, in the demultiplexer 145 according to the first aspect, when the logic-low first mux signal MUX1 is applied, the opposite logic-high compensation signal MUXP may be applied. In addition, when the logic-high first mux signal MUX1 is applied, the opposite logic-low compensation signal MUXP may be applied. Accordingly, the first transistor S1 to the fourth transistor S4 operate opposite to the first and third mux switches M1 and M3 or the second and fourth mux switches M2 and M4.

The first transistor S1 to the fourth transistor S4 are formed as thin film transistors on the display panel, and thus have parasitic capacitors. The parasitic capacitors included in the first transistor S1 to the fourth transistor S4 may be charged with the compensation signal MUXP before the first and third mux switches M1 and M3 or the second and fourth mux switches M2 and M4 are turned on. Thereafter, the parasitic capacitors included in the first transistor S1 to the fourth transistor S4 may maintain charged states when the first and third mux switches M1 and M3 or the second and fourth mux switches M2 and M4 are turned on, and such an operation may be repeated.

As such, when the first transistor S1 to the fourth transistor S4 are connected to the data lines DL1 to DL4, and the parasitic capacitors included therein are charged, the data lines are relatively stabilized, and thus a coupling phenomenon caused by the MUX signal may be minimized. For this reason, even when the logic-high first mux signal MUX1 is applied, the data voltage Vdata applied to the linear portion INA and the deformed portion INB does not increase, and is maintained close to the input data voltage Vdata (see INA' & INB'). This phenomenon may be confirmed from a simulation result of FIG. 16 in which, after the compensation signal MUXP is applied, the data voltage Vdata applied to the linear portion INA and the deformed portion INB does not increase, and is dragged down as INA' and INB'.

In addition, since an increase in the data voltage Vdata applied to the linear portion INA and the deformed portion INB is prevented (an increase in the luminance of the light-emitting diode is prevented), it is possible to relieve the black floating (a phenomenon in which it becomes brighter than desired black color) defect in the low gradation area. This may be confirmed from a simulation result of FIG. 17 in which a voltage Voled_INA applied to the light-emitting diode of the linear portion INA and a voltage Voled_INB applied to the light-emitting diode of the deformed portion INB do not increase to, and are dragged down as Voled_INA' and Voled_INB'.

As illustrated in FIG. 18A, the compensation signal MUXP may be applied in a form opposite to that of the first mux signal MUX1. As illustrated in FIGS. 18B to 18D, the compensation signal MUXP is configured in a form opposite to that of the first mux signal MUX1, and may be applied in a form that a rising edge, a falling edge, or the rising edge and the falling edge are delayed or advanced. That is, even though the compensation signal MUXP may be applied in a form opposite to that of the first mux signal MUX1, at least one portion of the signal may be varied in consideration of the turn-on or turn-off characteristics of the transistor or switch.

In addition, the compensation signal MUXP may be implemented by using the first mux signal MUX1 and in the form of inverting the signal using an inverter and varying at least one part of the signal using an inverter and a delayer.

FIG. 19 is a configuration diagram illustrating a demultiplexer according to a second aspect of the present disclosure.

As illustrated in FIG. 19, the demultiplexer 145 according to the second aspect may include a first mux switch M1 to a fourth mux switch M4 and a first capacitor C1 to a fourth capacitor C4. The first capacitor C1 to the fourth capacitor C4 are compensation circuits 148 that prevent coupling with the data lines when the first mux switch M1 to the fourth mux switch M4 are turned on.

The first capacitor C1 to the fourth capacitor C4 may be disposed close to the first mux switch M1 to the fourth mux switch M4 for signal coupling compensation. As an example, the capacitors C1 to C4 may be disposed between the data driving part 130 and the mux switches M1 to M4. As another example, the capacitors C1 to C4 may be disposed between the mux switches M1 to M4 and the subpixels SP1 to SP4. The capacitors C1 to C4 may be disposed between the mux switches M1 to M4 and the display area AA for efficient coupling compensation. However, the present disclosure is not limited thereto.

The first mux switch M1 to the fourth mux switch M4 may be turned on or off in response to the first mux signal and the second mux signal applied through the first mux signal line MUX1 and the second mux signal line MUX2. The first mux switch M1 and the third mux switch M3 may be simultaneously turned on or off in response to the first mux signal, and the second mux switch M2 and the fourth mux switch M4 may be simultaneously turned on or off in response to the second mux signal.

The first capacitor C1 may have a first electrode connected to the first data line DL1 and a second electrode connected to the compensation signal line MUXP. The second capacitor C2 may have a first electrode connected to the second data line DL2 and a second electrode connected to the compensation signal line MUXP. The third capacitor C3 may have a first electrode connected to the third data line DL3 and a second electrode connected to the compensation signal line MUXP. The fourth capacitor C4 may have a first electrode connected to the fourth data line DL4 and a second electrode connected to the compensation signal line MUXP.

The first capacitor C1 to the fourth capacitor C4 may maintain a charged state at a specific voltage or may be charged or discharged in response to a compensation signal applied through the compensation signal line MUXP. To this end, the compensation signal may be applied in the same pulse form (pulse voltage) as in the first aspect or may be applied in a DC form (direct voltage).

The first mux signal line MUX1 transmitting the first mux signal and the second mux signal line MUX2 transmitting the second mux signal are disposed to intersect the data lines DL1 to DL4. In addition, the compensation signal line MUXP that transmits the compensation signal is disposed to intersect the data lines DL1 to DL4.

The first capacitor C1 to the fourth capacitor C4 may maintain a charged state or may be charged or discharged in response to a compensation signal applied through the compensation signal line MUXP. In addition, since the data lines have relatively stable states due to the capacitors C1 to C4, a coupling phenomenon caused by the MUX signal may be minimized.

Meanwhile, in the description of the present disclosure, a 1:2 demultiplexer for time-division inputting a data voltage output from the first channel to the data driving part to two data lines has been described as an example, which is merely an example, and the present disclosure may be applied to a 1:N (N being an integer greater than or equal to 2) demultiplexer.

As described above, the present disclosure has an effect of preventing a data voltage fluctuation or a luminance fluctuation by minimizing the coupling effect due to the MUX signal that may be caused when the data voltage is transmitted. In addition, the present disclosure has an effect of minimizing the increase in the data voltage due to the coupling effect, thereby relieving a black floating defect that may occur during driving in the low gradation area. In addition, when the present disclosure is applied to the deformed display panel, there is an effect of minimizing the luminance deviation between the linear portion and the deformed portion.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A light-emitting display apparatus comprising:

a display panel configured to display an image;

a data driving circuit configured to apply a data voltage to the display panel;

a demultiplexer disposed between the data driving circuit and the display panel, which includes a plurality of mux switches;

a mux signal line configured to transmit a mux signal to the plurality of mux switches; and a signal applying circuit configured to apply a data voltage output from a first channel of the data driving circuit to one of at least two data lines disposed on the display panel, wherein the signal applying circuit includes a compensation circuit, wherein the compensation circuit includes a plurality of transistors including a first electrode, a second electrode, and a gate electrode, wherein the first electrode and the second electrode are connected to a data line transmitting the data voltage, and the gate electrode is connected to a compensation signal line to which a compensation signal is applied, wherein the plurality of transistors are turned on or turned off simultaneously based on the compensation signal applied through the compensation signal line, and wherein the plurality of transistors operate opposite to the plurality of mux switches to apply the data voltage, wherein for each data line, only one transistor among the plurality of transistors is connected to the data line, wherein, when the plurality of mux switches are turned on in response to a logic-high mux signal to apply the data voltage, the plurality of transistors are turned off in response to a logic-low compensation signal, when the plurality of mux switches are turned off in response to a logic-low mux signal not to apply the data voltage, the plurality of transistors are turned on in response to a logic-high compensation signal, and wherein the compensation signal is configured in a form opposite to a form of the mux signal, and is applied in a form that a rising edge, a falling edge, or the rising edge and the falling edge are delayed or advanced.

2. The light-emitting display apparatus of claim 1, wherein the compensation circuit is configured to prevent a data voltage increase caused by coupling with the mux signal line when the data voltage output from the first channel is applied to one of the at least two data lines and the mux switch is turned on.

3. The light-emitting display apparatus of claim 1, wherein the compensation circuit is disposed close to the signal applying circuit.

4. The light-emitting display apparatus of claim 1, wherein the compensation circuit is disposed between the signal applying circuit and a display area of the display panel.

5. The light-emitting display apparatus of claim 1, wherein the demultiplexer includes the compensation circuit.

* * * * *